Patented Sept. 16, 1947

2,427,488

UNITED STATES PATENT OFFICE 2,427,488

ASPHALT COMPOSITIONS HAVING IMPROVED ADHESIVITY TO AGGREGATE

Alvin P. Anderson, Lafayette, and Fred H. Stross, Berkeley Woods, Calif., assignors to Shell Development Company, San Francisco, Calif., a corporation of Delaware No Drawing. Application September 21, 1942, Serial No. 459,220

17 Claims. (Cl. 106—269)

This invention deals with the manufacture of asphaltic materials and of products containing the same. It is more particularly concerned with the coating of surfaces with asphalts and with the adhesion of asphalt coating in the presence of moisture. This invention is especially useful in the production of bituminous compositions, pavements, roads, floors, paints, rust preventives, pipe coatings, soil stabilization, and the like.

The term "asphalt" as used in describing this invention is meant to include bituminous materials containing asphaltenes or tarry constituents and comprises, for example: petroleum residues, pitches, road oils, albino asphalts; asphalt cutbacks, or solutions; cracked, straight run or natural asphalts; naturally occurring asphaltic rocks; tars and pitches derived from the distillation or extraction of coals, shales, lignites, wood, etc. Asphalts normally contain below 1% of alkaline salts and below 0.1% of free alkali. Certain unusual asphalts, so-called soda asphalts, may, however, contain much greater amounts, i. e. above 10% and up to 50%, of alkali salts and free alkalis. The treatment of such unusual asphalts is not contemplated in this invention.

It is well known that most asphalts have relatively good covering and adhesive properties to dry solids such as rocks, stones, sand, cement, iron, glass, etc. However, when the solid is moist or wet, it often becomes difficult or impossible to obtain a satisfactory bond between the solid and the bitumen. Furthermore, when a solid, however coated, is exposed to water, it often happens that water displaces more or less rapidly the asphalt from the solid or even may strip it completely.

This hydrophobic behavior of asphalts is a great detriment, particularly in the building of roads with unemulsified asphalts, since it is in general necessary to employ dry aggregate for construction and this involves costly drying or waiting for propitious weather. Furthermore, roads after construction may disintegrate under the influence of rain or telluric moisture when the bond between asphalt and aggregate fails. These difficulties are in general more pronounced in the case of acidic than basic aggregates. Thus in the past considerable effort was directed toward providing methods for successfully coating wet aggregate with asphalt and producing water resistant coverings.

The use of asphaltic emulsion or of low penetration paving asphalts may overcome these difficulties to some extent but is often too cumbersome and unreliable.

It has been repeatedly proposed to improve the water resistance of bonds between asphalts and solids, or the spreading tendency of asphalts upon wet surfaces or both these properties, by the addition of relatively small amounts, e. g. .5% to 2.0%, of various substances sometimes called "bonding agents."

In order to determine whether a given substance acts as a bonding agent, it is in general sufficient to perform a Total Water Immersion Test with a given aggregate and asphalt, as will be hereinafter described.

Bonding agents may be applied in many ways depending on the particular circumstances of their use. Thus they may be incorporated into the asphalt, either directly by thorough stirring, or by first dissolving them in a solvent and then commingling the solution with the asphalt. Moderate heating may be helpful. They may also be applied to the aggregate prior to the application of the asphalt, e. g., in the form of a solution in an organic solvent or as an aqueous solution or emulsion, or by other suitable means. When producing asphalt concrete it is sometimes convenient to admix them during the mixing of the asphalt and the aggregate.

As the necessary quantity of the bonding agents is small relative to that of the aggregate, it is in general advantageous to disperse them in a carrier fluid in order to insure thorough dispersion. The asphalt itself is almost always the most advantageous carrier and the favorite method of applying bonding agents is to disperse them in the asphalt at the refinery where thorough blending may be effected with the best equipment and under exacting control, both of which are in general unavailable at the road construction site. Such asphalts blended at the refinery are then shipped in tow cars or other vehicles to the construction site.

Bonding agents may in general be classified, according to their surface activity, into (1) non-polar, (2) surface anion-active, (3) surface cation-active and (4) soap type agents. Many bonding agents fall in the last two categories, but it must be noted that not all surface-active agents possess bonding powers when used as asphalt additives.

Among the non-polar surface inactive bonding agents, paraffin wax, montan wax and similar materials may be cited. They decrease the stripping tendency of asphaltic coats by imparting to the asphaltic film a rigidity which is sometimes sufficient to counteract the capillary forces exerted by water. These surface inactive bonding agents, however, have very little effect in facilitating the coating of wet aggregate with asphalt, and in the presence of stress, vibration or elevated temperature as encountered in most road applications, the rigidity which they impart is often insufficient to prevent stripping.

Anion-active bonding agents comprise, for example, higher saturated fatty acids, having, for example, at least 10 carbon atoms, naphthenic acids and some sulfonic acids found in petroleum sludges. These agents are effective towards basic rocks such as limestone, to facilitate their being coated when wet and to prevent their being stripped. These agents have, however, little or no effect on acidic rocks such as granite. A rather complicated and not always effective method of rendering acidic rocks susceptible to these agents consists in pre-coating them with a hydroxide of a polyvalent metal.

Cation-active bonding agents which are effective on acidic rocks comprise many lipophilic cation surface-active compounds such as, for example, most quaternary ammonium compounds, primary, secondary or tertiary mono or poly amines, aliphatic, cyclic nuclear or extranuclear, comprising at least one aliphatic saturated chain of 12 or more carbon atoms; many of their derivatives such as chloro-, hydroxo, sulfo-, ether, ester, etc., as well as mixtures of these compounds; analogous sulfur, phosphorus, arsenic, antimony, etc., derivatives; their salts, etc. Such compounds include, for example, trimethyl cetyl ammonium, lauryl pyridinium salts; methyl stearyl amine, chloro palmityl amine, stearic ester of ethanol amine, etc.

The use of cation-active bonding agents is subject to many difficulties such as lack of bonding properties despite surface activity, low solubility in asphalts, misleading rigidity effects which are difficult to appreciate, high cost, or thermal instability. The latter factor is of great importance since asphalts and asphaltic cutbacks are shipped in heated tank cars and other containers and are often heated prior to application for greater fluidity and covering power.

In the co-pending application of A. P. Anderson, Serial Number 422,034, filed December 8, 1941, it has been shown that by combining these two last types, i. e. cation- and anion-active bonding agents it is possible to obtain better adhesion and coating with asphalt than by the use of either of these bonding agents alone.

The soap type of bonding agents comprises soaps formed by organic acids with polyvalent metals. These soaps are water-insoluble but may be dissolved or dispersed in asphalts, and their addition to asphalts for the purpose of improving adhesion and coating of dry or damp solids has already been proposed. Many of these soaps do, in fact, prevent stripping of asphalt from some solids and particularly from basic aggregates, but others have little or no bonding properties and even those that do possess them, have but little effect upon the coating of wet aggregate with asphalt, and prevent but little the stripping from acidic aggregates. Among the soaps which belong to this type of bonding agent are products combining oil-soluble acids, particularly higher fatty acids, i. e., acids that have at least 12 carbon atoms in the molecule, naphthenic acids such as may be obtained by extraction of petroleum distillates with alkaline solutions, acids obtained by saponification of animal, plant, and most fish fats and oils, rosin acids, tall oil acids, aromatic acids having aliphatic side chains, acids obtained by oxidation of hydrocarbons, particularly of wax, wool, fat acids, higher organic sulfonates, and hydrogen-organic sulfates in which the organic radical contains 12 or more carbon atoms and other such acids with metals having a valence of at least 2 such as, for example, copper, calcium, magnesium, zinc, aluminum, tin, lead, antimony, chromium, manganese, iron, etc.

It may be noted that the bonding effect depends not only on the solid to be coated and the bonding agent, but also on proportion of the asphalt. Thus, certain asphalts may not be improved appreciably by cationic bonding agents, or the improvement may be only temporary. This lack of improvement, when it occurs, is due to the presence in these asphalts of water-soluble alkalis or certain alkaline salts and is more fully discussed in our co-pending application, Serial Number 422,100, filed December 8, 1941, which issued on February 27, 1945, as U. S. Patent No. 2,370,386 and of which the present application is a continuation-in-part. When the bonding power of an asphalt is improved by a bonding agent and the mixture of the two is stable, they are considered "compatible"; otherwise they are called "incompatible."

It has been observed that when cation and anion bonding agents are combined in an asphalt, in accordance with the above-mentioned application of A. P. Anderson, Serial No. 422,034, filed December 8, 1941, the improvement often tends to disappear upon prolonged storage, particularly at elevated temperature. This is due probably to the formation of amides by reaction between the cation-active amines and the anion-active carboxylic acid. The rate of this reaction depends greatly upon the structure of both the acid and the amine but proceeds at a finite rate with all combinations tested. In other words, an asphalt is rendered incompatible, to some extent, with cation-active bonding agents through the addition of anion surface-active or bonding agents.

Compatibility or incompatibility of an asphalt may be determined by the Total Water Immersion Test (T. W. I. T.) prior to heating and after heating as later described.

It is an object of this invention to improve the compatibility of incompatible asphalts and to render them compatible with cation-active bonding agents. Another object is to provide cation-active bonding agents which render compatible asphalts with which they are commingled. Another object is to improve the bonding properties of soap agents and to permit coating of basic aggregates with asphalt in the presence of water. Still further objects include the production of an all-purpose asphalt additive, capable of causing asphalt to coat and adhere to both acidic and basic solids, and the production of an all-purpose asphalt capable of such adhesion. The preparation of improved road-building, soil-stabilizing, culvert protecting materials of paints, sprays, and pipe are found among other objects of this invention as well as improvements hereinafter disclosed.

In our above-mentioned co-pending application, we have shown that asphalts which are normally incompatible may be rendered compatible with cationic agents by treatment with, or addition of, acids capable of neutralizing free alkali by forming salts which do not liberate free alkali, such as, for example, carboxylic acids, particularly saturated higher fatty acids, and other oil-soluble acids. We have also shown therein that the same result is obtained by the addition of salts capable of forming by metathesis with the alkali-forming components of the asphalt, products which do not liberate free alkali such as, for example, salts combining a strong acid with a metal belonging to periodic groups 2–8, especially of metals having a valence of 3 or more, such as iron, aluminum, lead, etc. We have also shown that asphalts containing both of these agents are thermally stable and have good bonding power to acidic aggregates.

Now, we have found that even asphalts which are normally compatible with cationic bonding agents may be greatly improved by the addition of both a soap type and cationic type bonding agent simultaneously, and that the separate bonding power of each of these agents is greatly enhanced by their simultaneous use.

Thus, according to the present invention, small amounts each of cationic bonding agents and soap bonding agents are incorporated into an asphalt and this asphalt is used for coating a solid.

In addition to improved compatibility, our combination has other advantages, such as the following. Soap agents when used alone are capable of greately improving the resistance of an asphalt against stripping, but they improve but little the coating properties of an asphalt upon a wet solid. This has already been pointed out above. Cationic bonding agents, on the other hand, have no influence upon the coating or stripping of asphalt from basic aggregates. However, the combination of these two agents gives to an asphalt the power not only to resist stripping to much greater extent, but also to coat wet basic as well as acidic aggregates.

Another advantage lies in enhanced improvement of coating properties to acidic aggregates. As has been pointed out above, cationic agents improve coating of wet acidic aggregate by asphalt, but this improvement has certain limitations in that when both coarse and fine particles are present in the aggregate, the fine particles are coated completely, while the coarse particles remain uncoated. This is a disadvantage which is not apparent when only coarse or only fine particles are present, but become serious when both kinds are used simultaneously as is usually the case in road building. However, the combination of agents, according to the present invention, gives an asphalt of such improved properties that it often coats all sizes of particles simultaneously.

It must be noted that the use of the combination of cationic and anionic bonding agents, according to the above-mentioned Anderson application, is incapable of providing this improvement.

Finally, as has been stated above, the compatibility of a cation-active agent with a normally compatible asphalt is reduced by the presence of anionic agents, according to this last-named application, while soaps of the present invention have less of this deleterious effect.

Solids toward which the combination of our bonding agents is effective comprise "acidic" surfaces, such as granite, quartz, feldspar, and many other igneous rocks, silica sands, diatomaceous earths, clays, mica, asbestos, etc.; such as limestone, certain basalts, etc.; basic "surfaces" aggregates comprising both acidic and basic components such as, for example, quartz sand commingled with limestone fines or to rocks which possess both acidic and basic surfaces; other solids, glass, Portland cement; iron, brass, copper, zinc, and many other metals; wood, synthetic resins such as phenolic resins, Glyptal resins, etc. Solids on which our invention is used should preferably be insoluble in the asphalt.

It will be understood that the two agents of our invention must not destroy or modify each other appreciably as by oxidation, reduction, hydrolysis, catalytic decomposition, etc.

The bonding and surface-active agents of this invention may be applied by incorporating them into the asphalt, either directly by thorough stirring, or by first dissolving them in a suitable solvent and then commingling the solution with the asphalt which has been liquefied by melting or by dissolution in a suitable solvent. Moderate heating may be helpful. The agents may also be applied to the aggregate prior to the application of the asphalt, e. g., in the form of a solution in an organic solvent or as an aqueous solution or emulsion, or by other suitable means. When producing asphaltic concrete it is often convenient to admix the agents while commingling the asphalt and the aggregate. The two agents may be applied separately by any of the above methods, or in admixture with one another.

We prefer to utilize this last method, i. e. to commingle thoroughly the two agents either alone or with a suitable solvent and then to produce an asphalt additive capable of imparting to an asphalt bonding properties toward both acidic and basic solids which bonding properties are but slightly affected adversely by storage or heat. This additive has the further advantage of being compatible with many asphalts normally incompatible with cationic agents.

Proportions of our agents vary with the nature of the surface to be covered. Other variables to be considered are the extent of the surface, the nature of the asphalt, the nature of the two agents, the method of application, and the degree of improvement desired. For most purposes, 0.01–3% and preferably 0.1%–1.5% of each by weight of the asphalt yield satisfactory results for binding road aggregates. If the agents are concentrated at the solid-asphalt interface, as by painting or spraying a concentrate thereof onto the solid before applying the asphalt, the necessary quantity may be somewhat reduced.

Examples of cation-active and soap-type agents have been given hereinbefore, and it has been pointed out that not all soaps nor all cationic surface-active materials have bonding properties. In order to determine whether a soap or a cationic surface-active agent possesses bonding properties, a Total Water Immersion Test (T. W. I. T.) with dry limestone or wet silica sand, respectively, should be performed, as hereinafter described.

Particularly suitable soaps are those formed by saturated fatty acids, having 12 or more carbon atoms in the molecule, such as lauric, myristic, palmitic, stearic, etc. acids or mixtures predominating therein, and acids obtained by oxidation of paraffin wax by oxidation with air or oxygen, if desired, in the presence of suitable catalyst. These last acids normally contain, besides the carboxylic group, also hydroxy and carbonyl groups and are very suitable for the present purposes. Metals which are particularly effective in the form of soaps of the above acids are lead, iron, and zinc.

Cation-active bonding agents, which we have found to be particularly suitable for the purpose of this invention, are those formed from wax by chlorination and ammonolysis, the former being conducted at a temperature of about 110° C. until a chlorine content of about 30% is reached, and the latter taking place at about 150° C. in the presence of a solvent such as alcohol. In the following description these cation-active compounds will be referred to as "paraffin wax amines," or "wax amines" for short.

Another class of highly suitable cationic agents is formed by alpha branched aliphatic primary amines, having more than 12 carbon atoms, which can be prepared from normal olefins (obtained, for example, according to the Van Peski patent, Number 2,172,228) by reaction with hydrochloric acid and subsequently ammonolysis, as more fully described in the co-pending application of F. Stross, Serial Number 459,221, filed September 21, 1942.

Normal aliphatic primary amines, having more than 14 carbon atoms in the molecule or mixtures of such amines, are also preferred for the purposes of this invention, though they are not quite as effective as the two above-mentioned classes.

The following may further illustrate our invention:

The "Total Water Immersion Test" or T. W. I. T., adopted to evaluate the bonding power of asphalts, is performed as follows:

If the test is performed on dry solid, five hundred grams of an aggregate passing 1.5 inch screen but retained by .75 inch screen is mixed for five minutes with 35 gms. of asphalt cutback in a large porcelain dish by means of a large aluminum spoon. If the test is to be performed on wet stone the aggregate is immersed in water for 30 minutes and drained prior to mixing with the cutback.

The coated rock is placed in a wide mouth, screw top, pint jar and the lid tightened. After allowing it to stand for 30 minutes, the contents of the jar are covered with distilled water, the jar closed and placed in a thermostat bath at 105° F. for 3 hours.

At the end of this time the stones are individually inspected, while under water, and the surface which has remained covered is evaluated visually and averaged for all stones. The result is expressed in tenths of the surface, rounded to the nearest integer and is reported as the T. W. I. T. value. Accordingly, if the stones remain on the average 95% or more covered with the asphalt at the end of the test, the T. W. I. T. value is 10; if they remain 45–55% covered, the value is 5. T. W. I. T. values of 5 or less may be considered as showing unsatisfactory, while 6–8 show fair to good and 9–10 excellent bonding power.

*Example*

A commercial cutback was treated with various additives as shown in the table and part of each mixture was tested by the T. W. I. T. and the remainder heated in a ¾ filled glass pressure bottle at 250° F. for 1 week and tested again. The results are shown in the following table.

| Additive | Aggregate | Before Heating | After Heating |
|---|---|---|---|
| ¼% wax acids+¼% $C_{16}$-$C_{18}$ amines. | Limestone | 10 | 5 |
| ¼% wax acids+¼% $C_{16}$-$C_{18}$ amines. | Granite | 10 | 1 |
| ¼% lead soap of wax acids+¼% $C_{16}$-$C_{18}$ amines. | Limestone | 10 | 10 |
| ¼% lead soap of wax acids+¼% $C_{16}$-$C_{18}$ amines. | Granite | 10 | 10 |

Another test measuring the covering power of an asphalt is the modified Nicholson test as described in the proceedings of the Association of Asphalt Paving Technologists, vol. 13, page 1ff. This test was performed on crushed granite or rock containing no clay with an amount of asphalt greater than the critical amount necessary to cover all particles. The results were reported as follows:

Very good—if all particles are completely covered and no oil separates in the water
Good—if small particles are coated, the large particles remain uncoated, but no oil separates
Fair—if a small amount of oil separates, but most of it remains in the particles
Bad—if the oil separates completely The following table gives the results of this test as performed on a commercial cutback to which various additives have been added:

| Additive | Aggregate | Before Heating | After Heating |
|---|---|---|---|
| ¼% $C_{16}$-$C_{18}$ normal amines and ¼% oxidized wax. | Crushed granite | Good | Poor. |
| ¼% $C_{16}$-$C_{18}$ normal amines and ¼% lead soap of oxidized wax. | Crushed granite | Very good | Good. |

We claim as our invention:

1. An asphalt composition comprising an asphaltic material containing dispersed small amounts each of a cation-active bonding agent free from amido groups and a water-insoluble metallic soap-type bonding agent said amounts being sufficient to improve the bonding power of asphalt.

2. An asphalt composition comprising an asphaltic material containing dispersed small amounts each of a cation-active bonding agent free from amido groups and of a water-insoluble metallic soap-type bonding agent, the latter combining an organic acid having at least 12 carbon atoms and a metal having a valence of at least 2 said amounts being sufficient to improve the bonding power of asphalt.

3. The product of claim 2 wherein said acid is a saturated fatty acid.

4. The product of claim 2 wherein said organic acid is an oxidized wax acid.

5. The product of claim 2 wherein said acid is stearic acid.

6. The product of claim 2 wherein said metal is lead.

7. An asphalt composition comprising an asphaltic material, a solid and small amounts each of a cation-active bonding agent free from amido groups and a water-insoluble metallic soap-type bonding agent said amounts being sufficient to improve the bonding power of asphalt.

8. The product of claim 7 wherein at least a portion of the surface of said solid is acidic.

9. The product of claim 7 wherein the surface of said solid comprises both acidic and basic constituents.

10. The product of claim 7 wherein the solid comprises finely divided constituents.

11. A road-building material comprising graded aggregate, asphaltic material and a small amount each of a cationic bonding agent free from amido groups and a water-insoluble metallic soap-type bonding agent said amounts being sufficient to improve the bonding power of asphalt.

12. An asphalt composition comprising an asphalt containing 0.01 to 3 wt.% of each cationic bonding agent free from amido groups and a water-insoluble metallic soap-type bonding agent.

13. An asphalt composition comprising an asphalt containing 0.1 to 1.5% by weight of each a cationic bonding agent free from amido groups and a water-insoluble metallic soap-type bonding agent.

14. The product of claim 1 wherein the asphaltic material is fluid under normal conditions.

15. The product of claim 7 wherein said bonding agents are concentrated at the asphalt-solid interface.

16. The product of claim 1 wherein the soap-type bonding agent is a lead soap of oxidized paraffin wax acids.

17. An asphalt composition comprising an asphaltic material containing dispersed therein small amounts sufficient to improve the bonding power of the asphaltic material of each of a cation active normal amine free from amido groups and a lead soap of oxidized paraffin wax acids.

ALVIN P. ANDERSON.
FRED H. STROSS.

REFERENCES CITED

The following references are of record in the file of this patent:

UNITED STATES PATENTS

| Number | Name | Date |
| --- | --- | --- |
| 2,317,959 | Johnson | Apr. 27, 1943 |
| 2,191,295 | Dohse et al. | Feb. 20, 1940 |
| 2,060,850 | Calcott et al. | Nov. 17, 1936 |

FOREIGN PATENTS

| Number | Country | Date |
| --- | --- | --- |
| 519,119 | Great Britain | Mar. 18, 1940 |
| 847,829 | France | July 10, 1939 |
| 848,911 | France | Aug. 7, 1939 |

OTHER REFERENCES

Proceedings of the Association of Asphalt Paving Technologists, vol. 12, 1941, pages 4–8.